United States Patent
Chee et al.

(10) Patent No.: US 11,018,852 B2
(45) Date of Patent: May 25, 2021

(54) BLOCKCHAIN TRUST ANCHOR

(71) Applicant: International Business Machines Corporation, Armonk, NY (US)

(72) Inventors: Yi-Min Chee, Yorktown Heights, NY (US); Krishna C. Ratakonda, Yorktown Heights, NY (US); Rakesh Mohan, Cortlandt Manor, NY (US); Ramesh Gopinath, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/230,212

(22) Filed: Dec. 21, 2018

(65) Prior Publication Data

US 2020/0204345 A1    Jun. 25, 2020

(51) Int. Cl.
*H04L 29/06* (2006.01)
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3265* (2013.01); *H04L 63/0478* (2013.01); *H04L 63/12* (2013.01); *H04L 2209/38* (2013.01)

(58) Field of Classification Search
CPC ... H04L 9/0637; H04L 63/0478; H04L 63/12; H04L 9/3265; H04L 9/0643; H04L 2209/38; H04L 9/3247; H04L 9/3239
See application file for complete search history.

(56) References Cited

U.S. PATENT DOCUMENTS

| | | | |
|---|---|---|---|
| 9,635,000 B1* | 4/2017 | Muftic | H04L 9/3239 |
| 10,762,079 B2* | 9/2020 | Shi | G06F 16/1834 |
| 2016/0292672 A1* | 10/2016 | Fay | G06Q 20/36 |
| 2016/0365978 A1* | 12/2016 | Ganesan | H04L 9/3297 |
| 2017/0116693 A1 | 4/2017 | Rae et al. | |
| 2017/0262862 A1 | 9/2017 | Aljawhari | |

(Continued)

FOREIGN PATENT DOCUMENTS

| | | | | |
|---|---|---|---|---|
| WO | WO-2017194815 A1 * | 11/2017 | | G06Q 20/1235 |
| WO | WO-2020024607 A1 * | 2/2020 | | H04L 9/3263 |

OTHER PUBLICATIONS

Feng, An information system for food safety monitoring in supply chains based on HACCP, Blockchain and internet things, Mar. 2018, ePubWU, the institutional repository of the WU Vienna University of Economics and Business, https://epub.cwu/ac.at/6090/> (Year: 2018).

(Continued)

*Primary Examiner* — John B King

(57) ABSTRACT

An example operation may include one or more of storing data via a blockchain ledger based on a consensus of a set of anchor blockchain nodes which are subset of nodes included in larger set of nodes in a blockchain network, receiving an access request from a blockchain member not included in the set of anchor blockchain nodes and which does not maintain a copy of the blockchain ledger, verifying a previously stored portion of the blockchain ledger which is accessible to the blockchain member based on the received access request, and sharing the previously stored portion of the blockchain ledger with the a computing system of the blockchain member based on the verification.

20 Claims, 13 Drawing Sheets

(56) References Cited

U.S. PATENT DOCUMENTS

| | | | |
|---|---|---|---|
| 2018/0068091 A1 | 3/2018 | Gaidar et al. | |
| 2018/0167217 A1 | 6/2018 | Brady et al. | |
| 2018/0285810 A1 | 10/2018 | Ramachandran et al. | |
| 2018/0322259 A1 | 11/2018 | Solow et al. | |
| 2019/0228388 A1* | 7/2019 | Hu | G06Q 20/4037 |
| 2019/0228391 A1* | 7/2019 | Hu | G06Q 20/065 |
| 2019/0306549 A1* | 10/2019 | Dietz | H04N 21/251 |
| 2019/0335715 A1 | 11/2019 | Hicks et al. | |
| 2019/0370798 A1* | 12/2019 | Hu | G06Q 20/389 |
| 2020/0005299 A1* | 1/2020 | Castinado | G06Q 20/401 |
| 2020/0042615 A1* | 2/2020 | Boudville | G06F 16/1805 |
| 2020/0133921 A1* | 4/2020 | Lee | H04L 9/0637 |
| 2020/0202014 A1* | 6/2020 | Xu | H04L 67/1097 |
| 2020/0202021 A1* | 6/2020 | Chee | H04L 63/10 |
| 2020/0226546 A1* | 7/2020 | Deshpande | G06Q 10/0833 |
| 2020/0380508 A1* | 12/2020 | Sheriff | G06Q 20/40 |

OTHER PUBLICATIONS

List of IBM Patents or Patent Applications Treated as Related, todays date.
Yi-Min Chee et al., "Dynamic Entitlement for Blockchain Data", U.S. Appl. No. 16/230,426, filed Dec. 21, 2018.
List of IBM Patents or Patent Applications Treated as Related, Jan. 15, 2019.
Ajay A. Deshpande et al., "Global Optimizer for Supply Chain", U.S. Appl. No. 16/247,059, filed Jan. 14, 2019.

* cited by examiner

600

BLOCKCHAIN TRUST ANCHOR

TECHNICAL FIELD

This application generally relates to a blockchain, and more particularly, to a blockchain network in which a subset of members (trust anchors) maintain and control peer nodes on behalf of other members of the blockchain who do not maintain a peer node but who have access rights to the blockchain ledger.

BACKGROUND

A centralized database stores and maintains data at one location. This location is often a central computing system such as a server or a mainframe computer. Information stored on a centralized database is typically accessible from multiple different points. For example, multiple users or client workstations can work simultaneously on the centralized database based on a client/server configuration. Because of its single location, a centralized database is easy to manage, maintain, and control, especially for purposes of security. Within a centralized database, data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure such that when a hardware failure occurs, data is lost and work of all users is interrupted. In addition, a centralized database is highly dependent on network connectivity. As a result, the slower the connection, the longer the amount of time needed for each database access. Another drawback is that bottlenecks can occur when the centralized database experiences high traffic. Furthermore, the centralized database provides limited access to data because only one active/productive copy of the data is maintained. As a result, multiple users may not be able to access the same piece of data at the same time without creating problems such as overwriting necessary data. Furthermore, because a central database has minimal to no data redundancy, lost data can be difficult to retrieve other than through manual operation from back-up disk storage.

Across global supply chains, financial services, healthcare, government and many other industries, innovators are exploring ways to use blockchain to disrupt and transform traditional storage into a decentralized storage scheme. Many industry leaders have already achieved significant business benefits, including greater transparency, enhanced security, improved traceability, increased efficiency and speed of transactions, and reduced costs, through the use of blockchain storage.

Typically, participation in a blockchain network requires each organization (member) to manage and control a peer node within the blockchain network. Management of a peer node requires significant investment in resources and skills because a peer node must participate in maintenance of a distributed ledger, security of the ledger, smart contract implementation and execution, and the like. Such resources can be difficult to maintain for some participants and can be a deterrent to future participants in joining the blockchain network. Accordingly, what is needed is more efficient way of implementing a blockchain network that does not require significant resource consumption of all members of the blockchain network.

SUMMARY

One example embodiment may provide a system that includes one or more of a storage configured to store data via a blockchain ledger based on a consensus of a set of anchor blockchain nodes which are subset of nodes included in larger set of nodes in a blockchain network, a network interface configured to receive an access request from a blockchain member not included in the set of anchor blockchain nodes and which does not maintain a copy of the blockchain ledger, and a processor configured to one or more of verify a previously stored portion of the blockchain ledger which is accessible to the blockchain member based on the received access request, and share the previously stored portion of the blockchain ledger with a computing system of the blockchain member based on the verification.

Another example embodiment may provide a method that includes one or more of storing data via a blockchain ledger based on a consensus of a set of anchor blockchain nodes which are subset of nodes included in larger set of nodes in a blockchain network, receiving an access request from a blockchain member not included in the set of anchor blockchain nodes and which does not maintain a copy of the blockchain ledger, verifying a previously stored portion of the blockchain ledger which is accessible to the blockchain member based on the received access request, and sharing the previously stored portion of the blockchain ledger with the a computing system of the blockchain member based on the verification.

Another example embodiment may provide a non-transitory computer readable medium comprising instructions, that when read by a processor, cause the processor to perform one or more of storing data via a blockchain ledger based on a consensus of a set of anchor blockchain nodes which are subset of nodes included in larger set of nodes in a blockchain network, receiving an access request from a blockchain member not included in the set of anchor blockchain nodes and which does not maintain a copy of the blockchain ledger, verifying a previously stored portion of the blockchain ledger which is accessible to the blockchain member based on the received access request, and sharing the previously stored portion of the blockchain ledger with the a computing system of the blockchain member based on the verification.

DETAILED DESCRIPTION

Figure 1:
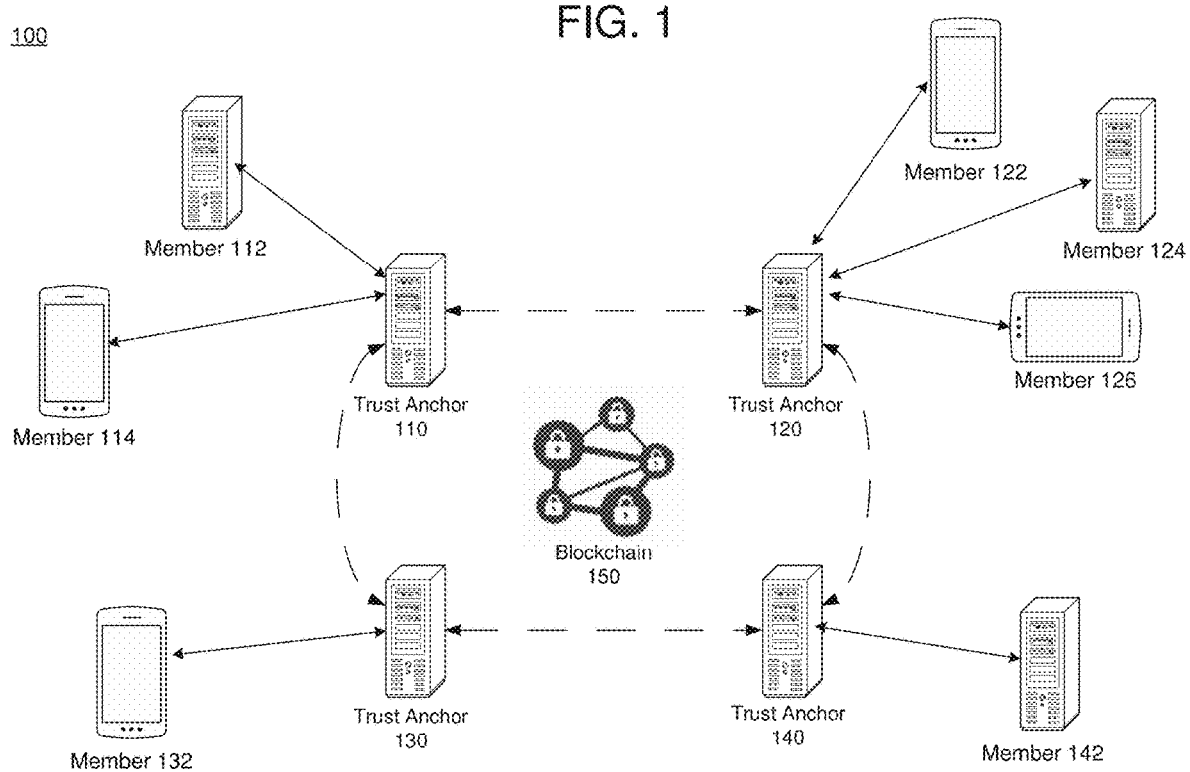
FIG. 1 is a diagram illustrating a trust anchor-based blockchain network according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which implement a blockchain-based solution which provides trust guarantees to blockchain network participants via trust anchors, where not all blockchain participants in the blockchain network operate blockchain nodes.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties may be referred to herein as peers or nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts trans-action-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

In a typical blockchain-based network, all blockchain member participants must operate nodes in the blockchain network, requiring all participants to invest in the resources such as computing equipment, network capabilities, storage, etc., as well as skills (e.g., programming, maintenance, memory management, etc.) required to keep the blockchain node running. However, in the context of a given domain solution, it's often the case that not all participants will have the necessary resources or desire to operate nodes in the blockchain network.

Furthermore, many blockchain networks require privacy of transactions/data between member participants, so that only specific member participants have visibility to specific transactions and data. Private channels are a mechanism for dealing with this problem, but many solutions involve interactions between multiple member participants where the nature of the interactions is highly dynamic, and the number of subsets of participants that are working together grows exponentially over time with the overall number of member participants, requiring exponential growth the number of private channels.

The example embodiments overcome these drawbacks of a traditional blockchain network through the implementation of a trust-anchor based scheme in which a subset of blockchain members operate peer nodes while remaining blockchain members access the blockchain through a trust anchor instead of maintaining a blockchain peer node. The trust anchor-based scheme provides multi-tiered trust in a blockchain network where a subset of the participants operate nodes in the network and provide trust guarantees for the overall larger set of member participants. In order to address the dynamic nature of interactions between participants without requiring significant scaling of channels, the set of trust anchor nodes may operate over a single, shared channel, where all transaction data is encrypted such that trust anchors only handle encrypted data.

Some benefits of the instant solutions described and depicted herein include the ability of organizations to benefit from the security, immutability, accessibility, etc. of a blockchain-based network without having to maintain a blockchain peer node and the resources and skill required for such an undertaking. The example embodiments leverage the immutability of the blockchain ledger and the decentralized nature of the blockchain to provide trust guarantees for the data handled by the trust anchors, while consensus and endorsement provide proof of the trust anchors' involvement in ensuring the provenance of the data submitted and stored via the blockchain.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, decentralization, consensus, endorsement, accessibility, and the like. It should also be appreciated that the example embodiments could not be implemented using a traditional database without adding features to the database that would essentially make it a blockchain because of the need for decentralized, independently controlled copies of the ledger that are only updated upon consensus amongst a set of trust anchors.

FIG. 1 illustrates a trust anchor-based blockchain network 100 according to example embodiments. Referring to FIG. 1, the network 100 includes two different kinds of member participants in a blockchain 150. In particular, a subset of member participants (e.g., trust anchor nodes 110, 120, 130, and 140) maintain a copy of the blockchain 150. Meanwhile, remaining member participants not included in the set of trust anchor nodes 110-140 access the blockchain 150 via one of the trust anchor nodes. For example, member participants 112 and 114 access the blockchain 150 via trust anchor node 110, member participants 122, 124, and 126 access the blockchain 150 via trust anchor node 120, member participant 132 access the blockchain 150 via trust anchor node 130, and member participant 142 accesses the blockchain 150 via trust anchor node 140. According to various embodiment, non-trust anchor member participants (112, 114, 122, 124, 126, 132, and 142) do not maintain blockchain peer nodes, and therefore don't keep a copy of the blockchain ledger (e.g., distributed ledger storing blockchain, world state DB, key value store, etc.)

According to various embodiments, trust anchors provide trust guarantees without requiring every member participant to operate a node, thereby reducing the operating burden (in terms of transaction simulation, endorsement, consensus and storage) for the participants who do not maintain peer nodes. Meanwhile, trust anchor nodes endorse transactions, maintain a copy of the blockchain ledger, and verify access rights to data for all member participants. In some cases, a non-trust anchor participant can later become a trust anchor (and conversely, a trust anchor can be relieved of its duties and become a non-trust Anchor participant). Non-trust anchor member participants may be associated with one or more of the trust anchors from a blockchain perspective. This can be done in a random fashion, or by allowing the non-trust anchor member participants to select a specific Trust Anchor to be associated with. This association is created whenever a new member participant is added to the solution.

A trust anchor channel between the trust anchor nodes (e.g., trust anchors 110-140 shown in FIG. 1) may be initiated by a network convener. Trust anchors are selected via a governance process and joined to the network and channel. All data may be written to the network channel and may be encrypted so as to maintain the security and privacy of the data. Only trust anchors may maintain a copy of the transactions. Meanwhile, non-trust anchor member participants can obtain/retrieve the data they are entitled to from any of the trust anchor nodes.

In contrast to typical permissioned blockchain-based solutions where every member participant in the solution operates a node in the network, the example embodiments allow for overall trust to be maintained by a subset of the participants (trust anchors), while other members are freed from the burden of operating a blockchain peer node. In order to provide this trust to non-trust anchor participants, the blockchain network according to various embodiments enables non-trust anchor member participants to associate themselves with particular trust anchor(s) for endorsement/consensus purposes, and imposes requirements on the trust anchors to provide the ability for the associated non-trust anchors to verify data against the contents of their blockchain ledgers, while ensuring that the trust anchors do not have visibility to any data to which they are not entitled.

Figure 2A:
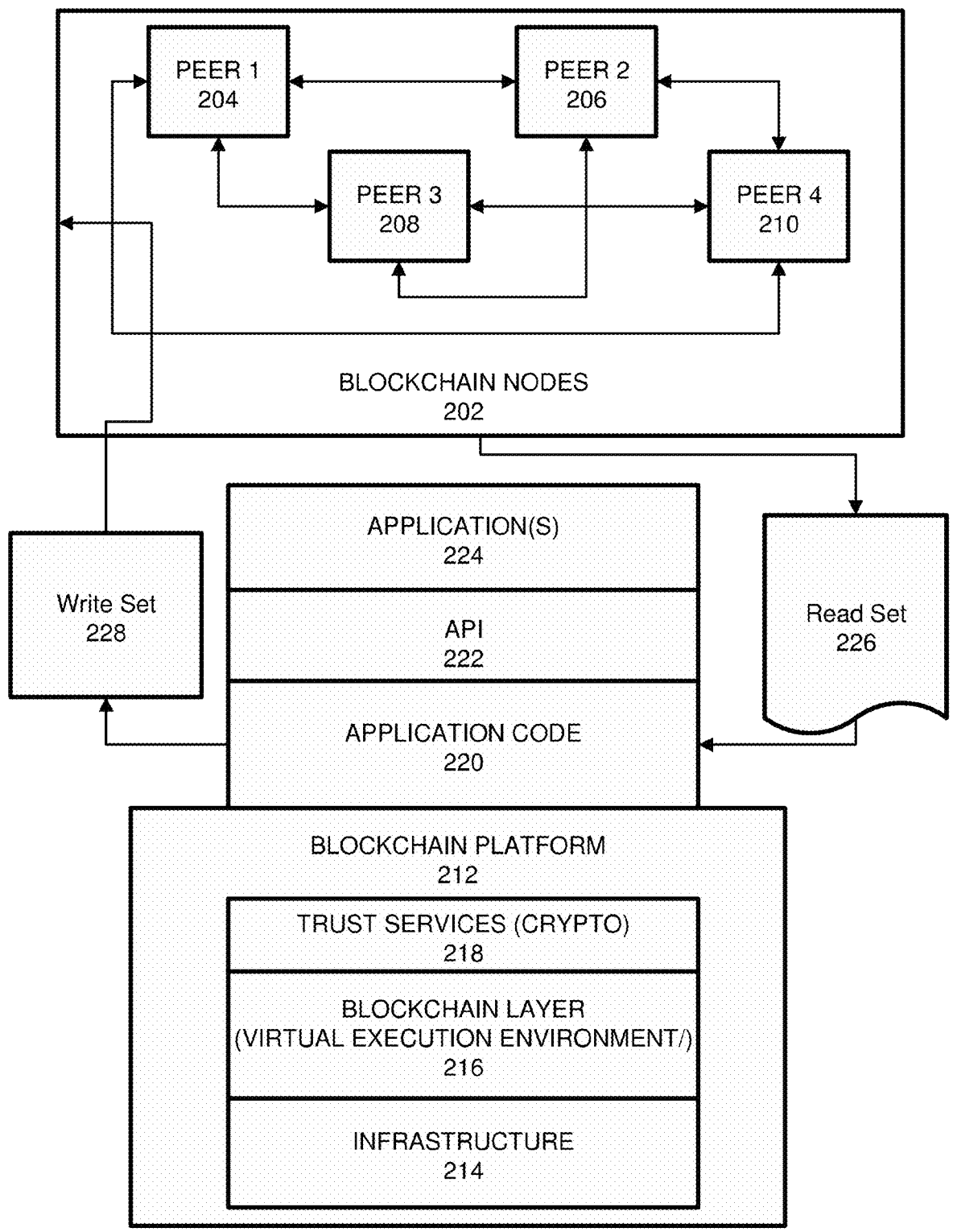
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202 including individual nodes 204-210. According to various embodiments, the blockchain nodes 202 may be referred to as trust anchor nodes. These nodes participate in a number of activities, such as blockchain transaction addition and validation process (consensus). One or more of the blockchain nodes 204-210 may endorse transactions based on an endorsement policy and may provide an ordering service for all blockchain nodes in the architecture 200. A blockchain trust anchor node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract (e.g., trust anchor smart contract, private channel smart contract, etc.) and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger such as rules among the trust anchor nodes, and rules between a trust anchor and one or more non-trust anchor members that access the blockchain via the trust anchor node. In the examples herein, a read set 226 may be processed by one or more processing entities (e.g., virtual machines) included in the blockchain layer 216. A write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified. According to various embodiments, the read set 226 may include a current processing step of the multi-party process. Meanwhile, the write set 228 may include the execution results of the processing step which may include an identification of the step, sending and receiving events performed during the processing step, and the like.

A chaincode may include the code interpretation of a smart contract, with additional features. As described herein, the chaincode may be program code deployed on a computing network, where it is executed and validated by chain validators together during a consensus process. The chaincode may be generated based on a plurality of state charts of a blockchain and a plurality of off-chain systems. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
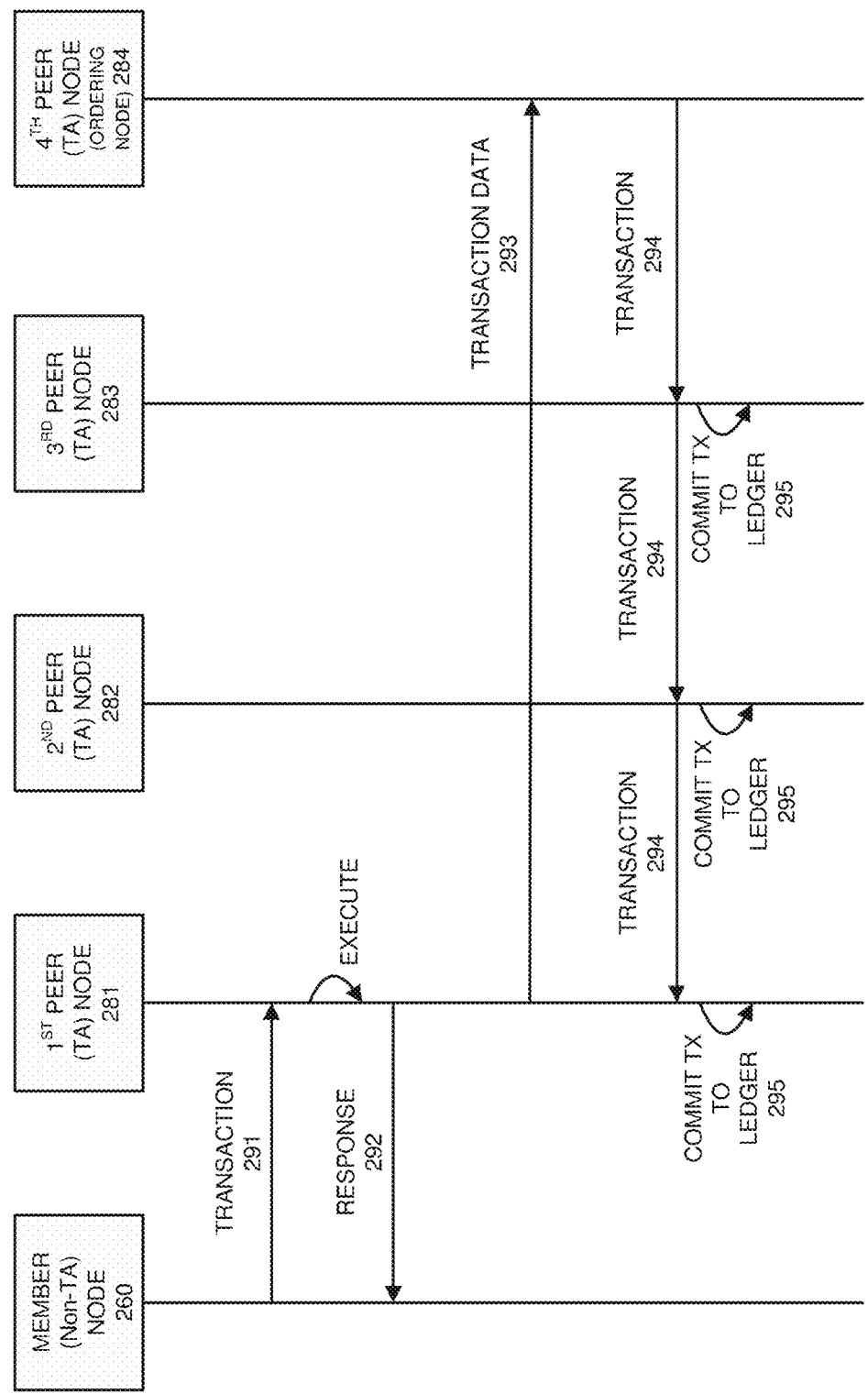
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by a non-trust anchor member 260 to an endorsing peer node 281. For example, the member node 260 may include a blockchain member participant who is not included in the trust anchor node set. Meanwhile, a plurality of trust anchor nodes 281-284 may perform operations to store the data from the member into a blockchain maintained by the trust anchor nodes 281-284. In this example, endorsing peer 281 may verify the client signature and execute a trust anchor chaincode function to initiate the transaction. The output may include the chaincode results, a set of key/value versions that were read in the chaincode (read set), and the set of keys/values that were written in chaincode (write set). A response 292 may be sent back to the member informing of trust anchor receipt of the transaction. Furthermore, the trust anchor node (endorsement node 281) may assemble the endorsements into a transaction payload 293 and broadcasts it to an ordering service node 284. The ordering service node 284 then delivers ordered transactions as blocks to all peers 281-283 on a channel of the trust anchors. Before committal to the blockchain, each peer 281-283 (trust anchor) may validate the transaction. For example, the peers may check the endorsement policy to ensure that the correct allotment of the specified peers have signed the results and authenticated the signatures against the transaction payload 293.

The member node 260 may initiate the transaction 291 by constructing and sending a request to the peer node 281, which is an endorser. The transaction proposal 291 may include a request to store information about execution results of a sub-component of a software model. There may be more than one endorser, but one is shown here for convenience (i.e., peer node 281). The member node 260 may include an application (e.g., web application, etc.) that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the member's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (member 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. According to various embodiments, the transaction results may include a result of executing a current step of the multi-party process.

In response, the member 260 inspects/verifies the endorsing peers signatures and compares the proposal responses to determine if the proposal response is the same. If the chaincode only queried the ledger, the application would inspect the query response and would typically not submit the transaction to the ordering node service 284. If the member intends to submit the transaction to the ordering node service 284 to update the ledger, the chaincode on the trust anchor node 281 determines if the specified endorsement policy has been fulfilled before submitting (i.e., did all peer nodes necessary for the transaction endorse the transaction). Here, the member may include only one of multiple parties to the transaction. In this case, each member may have their own trust anchor/endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the endorsing node 281 assembles endorsements into a transaction and broadcasts the transaction proposal and response within a transaction message to the ordering node 284. The transaction may contain the read/write sets, the endorsing peers signatures and a channel ID, as well as the timestamp information and multi-party process information described herein such as an identification of the current step executed, send and receive events performed during the step, and the like. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the member that the transaction (invocation) has been immutably appended to the chain, as well as to notify whether the transaction was validated or invalidated.

Figure 3:
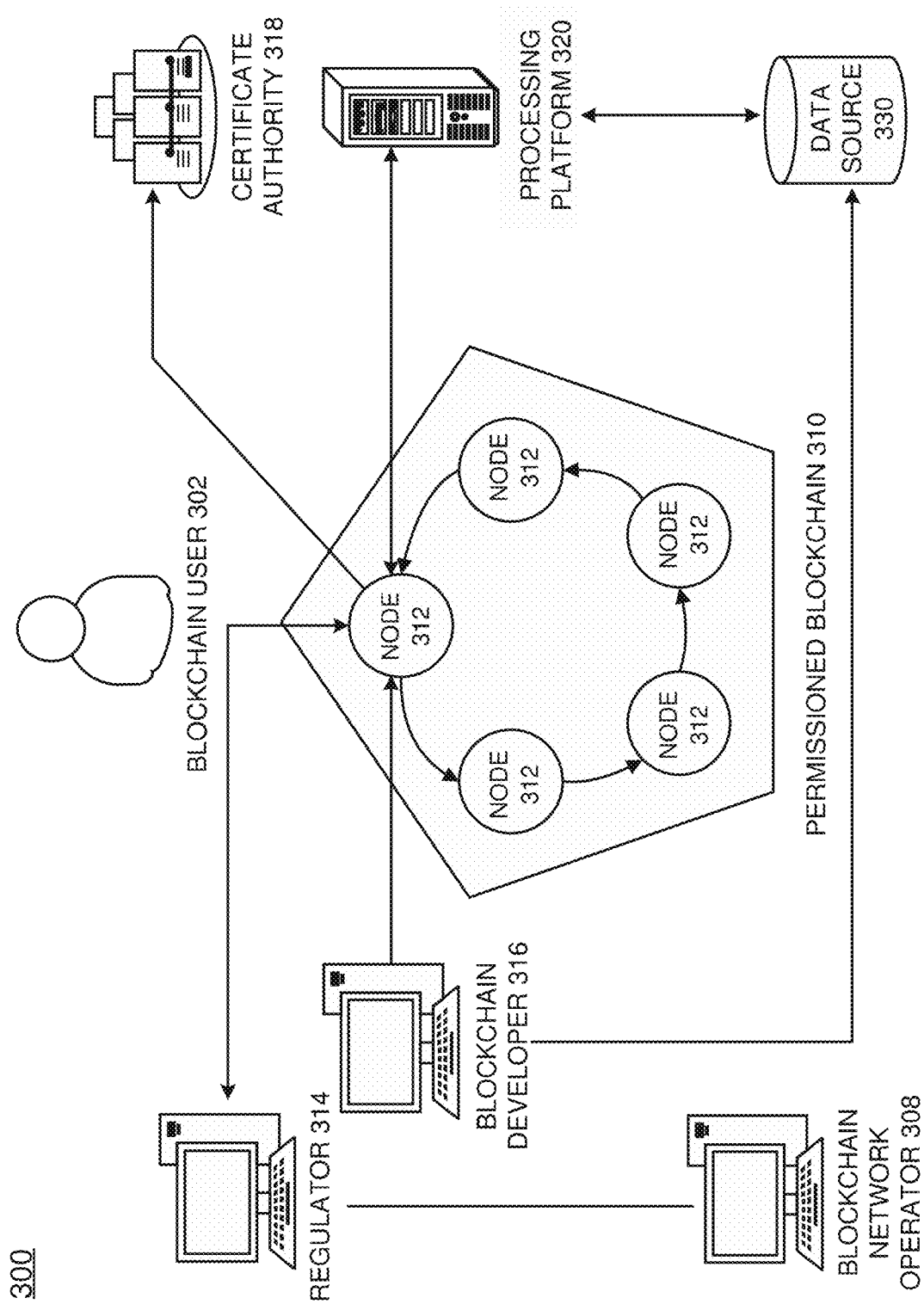
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
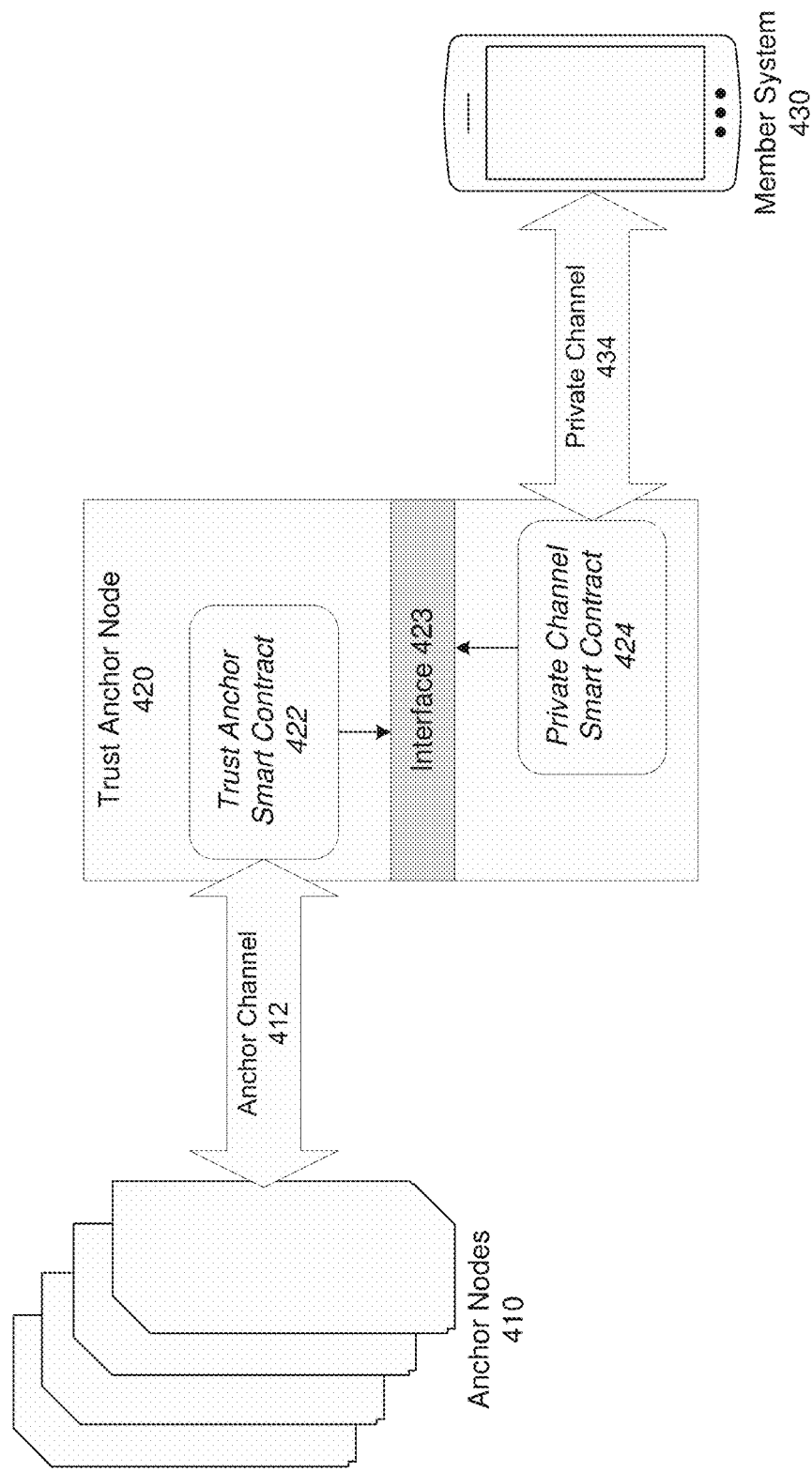
FIG. 4 is a diagram illustrating a communication process between a set of anchor nodes and a non-anchor node member participant according to example embodiments.

FIG. 4 illustrates a communication process 400 with a non-anchor node member participant 430 performed by a trust anchor 420 included in a set of anchor nodes 410 according to example embodiments. Referring to FIG. 4, the anchor node 420 included in the set of anchor nodes 410 provides an interface 423 for communication, access, blockchain events, etc., between the member participant 430 and the blockchain ledger maintained by the set of trust anchor nodes 410. Here, the trust anchor node 420 may communicate with other trust anchor nodes in the set of anchor nodes 410 via a trust anchor channel 412 implemented via a trust anchor smart contract 422. Meanwhile, the trust anchor node 420 may communicate with all member systems 430 that are assigned to the trust anchor node 420. Here, the trust anchor node 420 may establish a private channel 434 for communication with the member system(s) 430 implemented via a private channel smart contract 424. In some embodiments, the trust anchor node 420 may also provide an interface 423 that enables secure communication between the set of trust anchor nodes 410 and the trust anchor smart contract 422 and the private channel smart contract 424 and the member system(s) 430.

According to various embodiments, provided is a blockchain network that consists of members who act as the trust anchors for other members who do not maintain a blockchain peer node but which are still members of the blockchain. The network provides guarantees to all participating organizations. A trust anchor node may provide a tamper-proof recording and non-repudiation for all data submitted to the trust anchor node. The data submitted may be signed by the submitter and recorded in the blockchain ledger managed by the set of trust anchor nodes such as the set of trust anchor nodes 410 shown in FIG. 4. A trust anchor may provide verifiability of data against the recorded proof of submission on the blockchain. Every piece of data can be verified against a hash of its original submitted content.

Recoverability of the data recorded on the blockchain may be performed by the trust anchor node. For example, data is distributed and replicated amongst the replicated copy of the blockchain ledger shared among the trust anchors. Privacy of data may be ensured such that it is only shared with relevant organizations. All data may be encrypted, and trust anchor peers may not handle unencrypted data. The trust anchors may be chosen so as to maximize the integrity and trust of the solution. Trust anchors fulfill their roles and responsibilities as described, and no particular benefit accrues to them as a result.

A trust anchor has the role and responsibility of maintaining peer(s) with the necessary compute, network, and storage resources to handle the required transaction volumes needed for the solution, and ensuring continued operation of the peer(s). Other responsibilities include executing transactions (chaincode) for submission of data to the solution, endorsement that is performed automatically when transaction proposals are addressed to the trust anchor, serving requests for validation of data or retrieval of encrypted data held by the trust anchor, validation and retrieval are handled automatically via chaincode query, and the like.

Thrust anchors may be joined to a common trust anchor channel. This common channel records hashes and encrypted copies of all data submitted to the solution. In some embodiments, a trust anchor may replicate every piece of data on a subset of Trust Anchors instead of on every trust anchor. If scale of transactions or geographic locality considerations dictate, the network could be partitioned into multiple trust anchor channels which each handle a subset of the overall transaction volume.

The example embodiments may support the use of Smart contracts to enforce use-case specific business logic that is executed against the verifiable data recorded by the solution. Smart contracts may be enabled through the use of private data channels. Participating organizations on a private data channel will be blockchain members, but will not act as trust anchors and will not be joined to the trust anchor channel. A given member can participate in one or more private data channels.

A private data channel may receive, in unencrypted form, all data that is accessible to all of the parties (non-TA blockchain members) on the private data channel. For example, if the private data channel consists of three members, it may only receive data that all three members are entitled to. A smart contract on the private data channel may implement an interface that will be invoked by the trust anchor node with entitled data for the private data channel. The Smart Contract can choose to persist the data to the Private Data Channel ledger or not, depending on its own requirements.

Data passed to the private data channel can be verified against the trust anchor channel by comparing the hash of the data with the hash on the trust anchor channel. Every piece of data submitted to the trust anchor subset may be written to the blockchain by submitting a transaction that executes the trust anchor chaincode on trust anchor peers. The trust anchor signs the contents and result of each transaction proposal it executes, and the blockchain fabric (e.g., Hyperledger, etc.) may guarantee that signed transaction proposals from different trust Anchors must contain valid signatures and be in agreement as to the result of a transaction execution in order for it to be committed as a valid transaction to the ledger.

Flexible endorsement policies allow for the requirements as to how many and which members (trust anchors) must endorse each transaction to be tailored as needed. In some embodiments, to promote transparency, the trust anchor chaincode may be made available in source code form.

At the time of submission, each piece of data submitted to the trust anchor subset of nodes is written to the blockchain. The blockchain contents may include the original source XML document, stored in encrypted form using a unique per-asset encryption key assigned by the solution, as well as a SHA256 hash of the source XML, document. To perform verification, each asset may have a unique asset identifier, which is returned by the solution. The asset metadata may also contain the SHA256 hash of the source XML document that was submitted, and the per-asset encryption key used to encrypt the asset on the blockchain.

The source XML document can be obtained from the solution and hashed to ensure that it matches the source hash stored in the asset metadata. The source hash can be obtained from the blockchain by sending an asset hash query transaction proposal to the trust anchor chaincode, passing its unique asset identifier. The returned source hash can be compared against the hash returned in the solution metadata to verify that the two match. The encrypted source XML can be retrieved from the blockchain by sending an asset query transaction proposal to the trust anchor chaincode, passing its unique asset identifier. The returned source can then be decrypted using the per-asset encryption key returned by the solution, and hashed to ensure that it matches the asset hashes returned by the solution and blockchain, or compared directly against the source XML document obtained from the solution. For additional verification, the query transaction proposals can be sent to any number of trust anchor peers, to ensure that their ledger contents all agree. To ensure that the verification can be done independently and in a transparent manner, application source code will be provided for performing the steps above.

Figure 5:
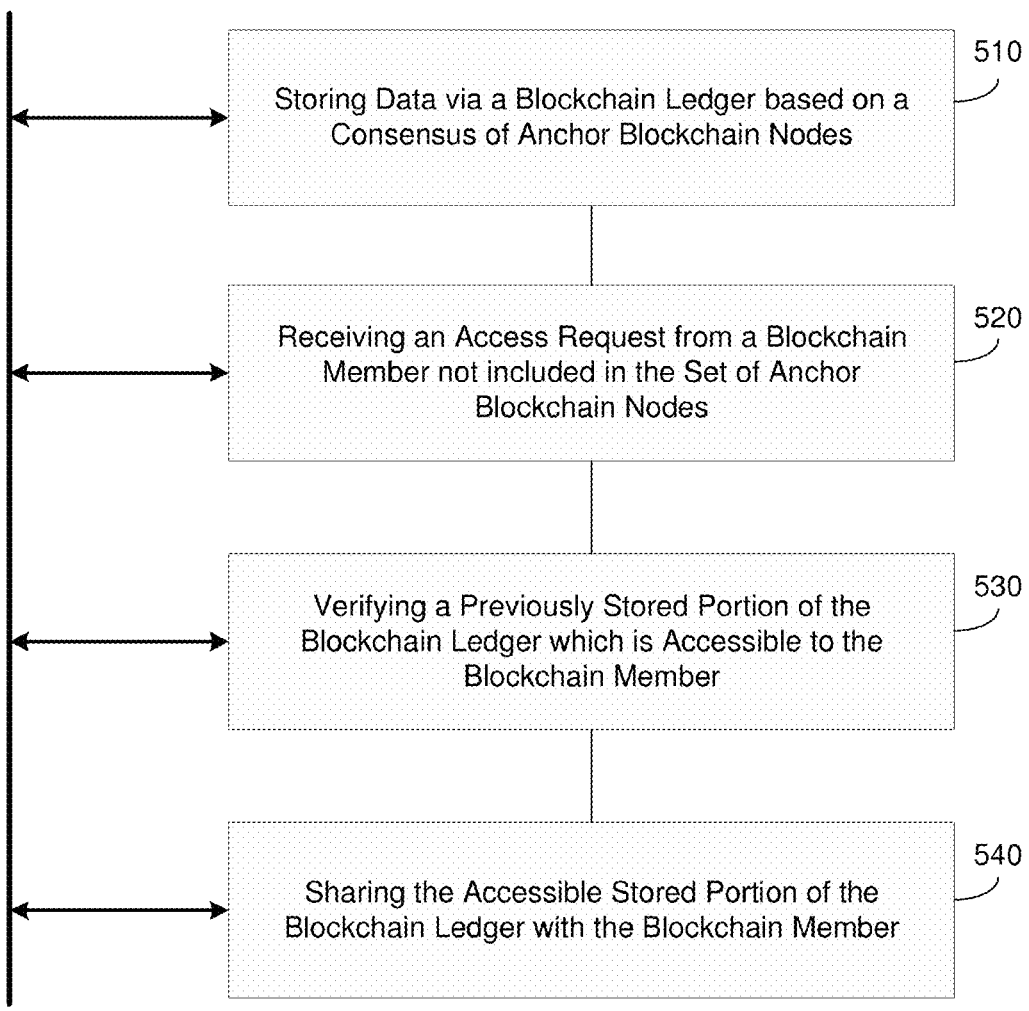
FIG. 5 is a diagram illustrating a method of a trust anchor sharing blockchain ledger content with a non-trust anchor according to example embodiments.

FIG. 5 illustrates a method 500 of a trust anchor sharing blockchain ledger content with a non-trust anchor according to example embodiments. For example, the method 500 may be performed by a blockchain peer node that may be a computing system. As another example, the method 500 may be performed by an off-chain system such as a server, a database, a user device, a combination of devices, and the like. In some embodiments, the method 500 may be performed by a combination of any of the systems.

Referring to FIG. 5, in 510, the method may include storing data via a blockchain ledger based on a consensus of a set of anchor blockchain nodes which are subset of nodes included in larger set of nodes in a blockchain network. For example, the storing may include data from members of the blockchain network which are outside or otherwise not included within a subset of trust anchor blockchain nodes. Here, the anchor blockchain nodes may be determined to maximize efficiency for all members of the blockchain network. The set of anchor blockchain nodes endorse transactions, maintain a replica of the blockchain ledger, and verify blockchain data for the blockchain member that does not maintain a copy of the blockchain ledger. The data stored via the blockchain ledger may include only data that has been endorsed by a consensus of anchor blockchain nodes from among the set of anchor blockchain nodes. In some embodiments, the stored data comprises a document which is encrypted based on a unique per-asset encryption key.

In 520, the method may include receiving an access request from a blockchain member not included in the set of anchor blockchain nodes and which does not maintain a copy of the blockchain ledger. The access request may identity a document, a block, a transaction, or the like, which the member is authorized to have access to. In 530, the method may include verifying that a previously stored portion of the blockchain ledger identified from the request is accessible to the blockchain member based on identification information stored within the trust anchor nodes. The identification information may identify which members are associated with which data files, etc., stored on the blockchain ledger managed by the trust anchor nodes. In 540, the method may include sharing the previously stored portion of the blockchain ledger with the a computing system of the blockchain member based on the verification. In some embodiments, the sharing may include transmitting the previously stored portion of the blockchain ledger to the computing system of the blockchain member based on the verification.

In some embodiments, the method may further include establishing a private channel between the anchor blockchain node and the computing system of the blockchain member which is exclusive from a blockchain channel between the set of anchor blockchain nodes. In some embodiments, the method may further include receiving a data file for storage from the blockchain member that is not included in the set of anchor blockchain nodes. In some embodiments, the method may include transmitting the received data file to the set of anchor blockchain nodes for endorsement and consensus among the set of anchor blockchain nodes.

Figure 6A:
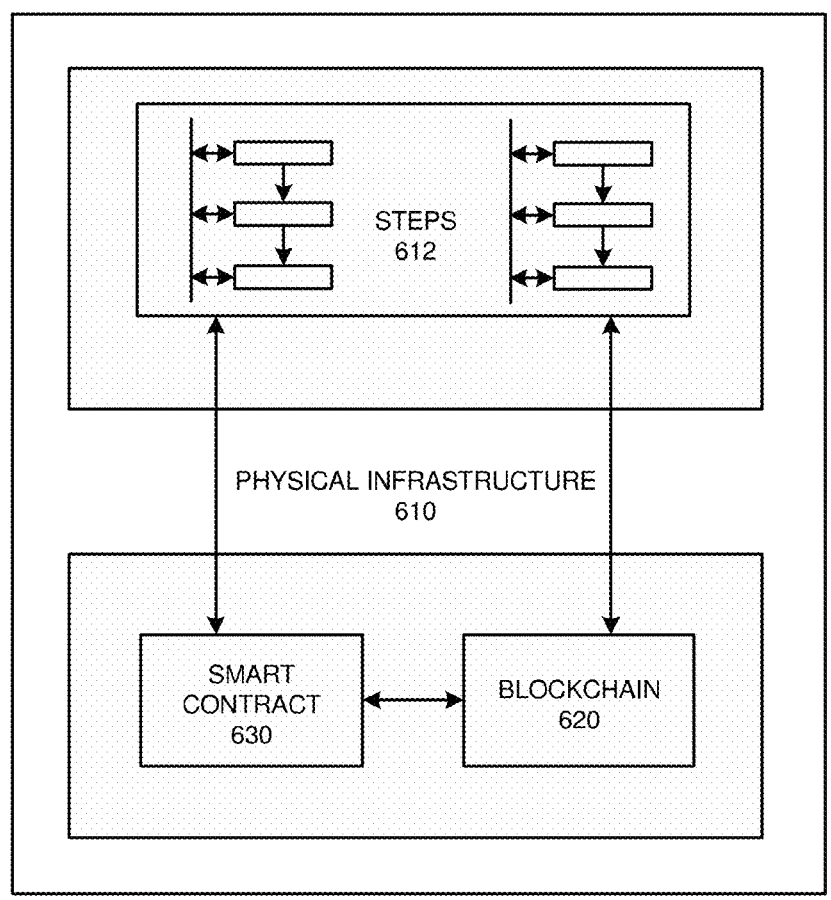
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps 612 may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
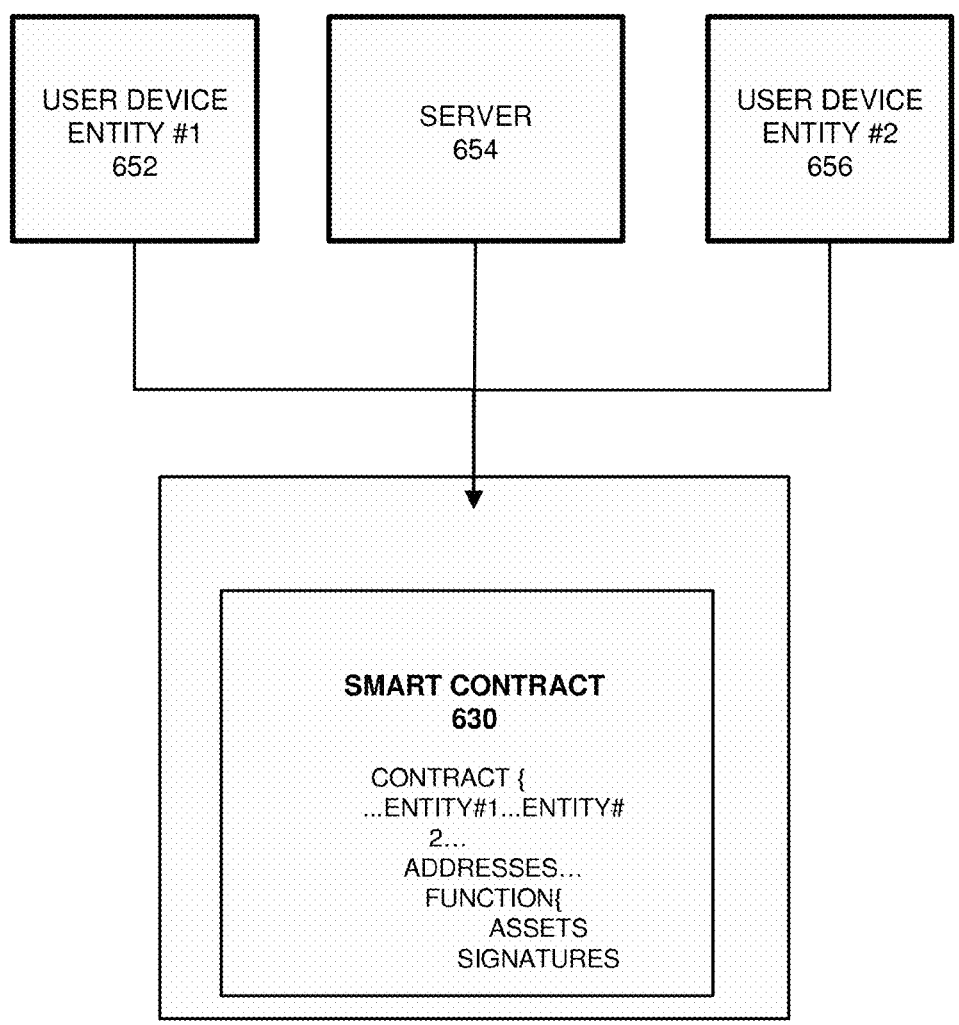
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a multi-party process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

Figure 6C:
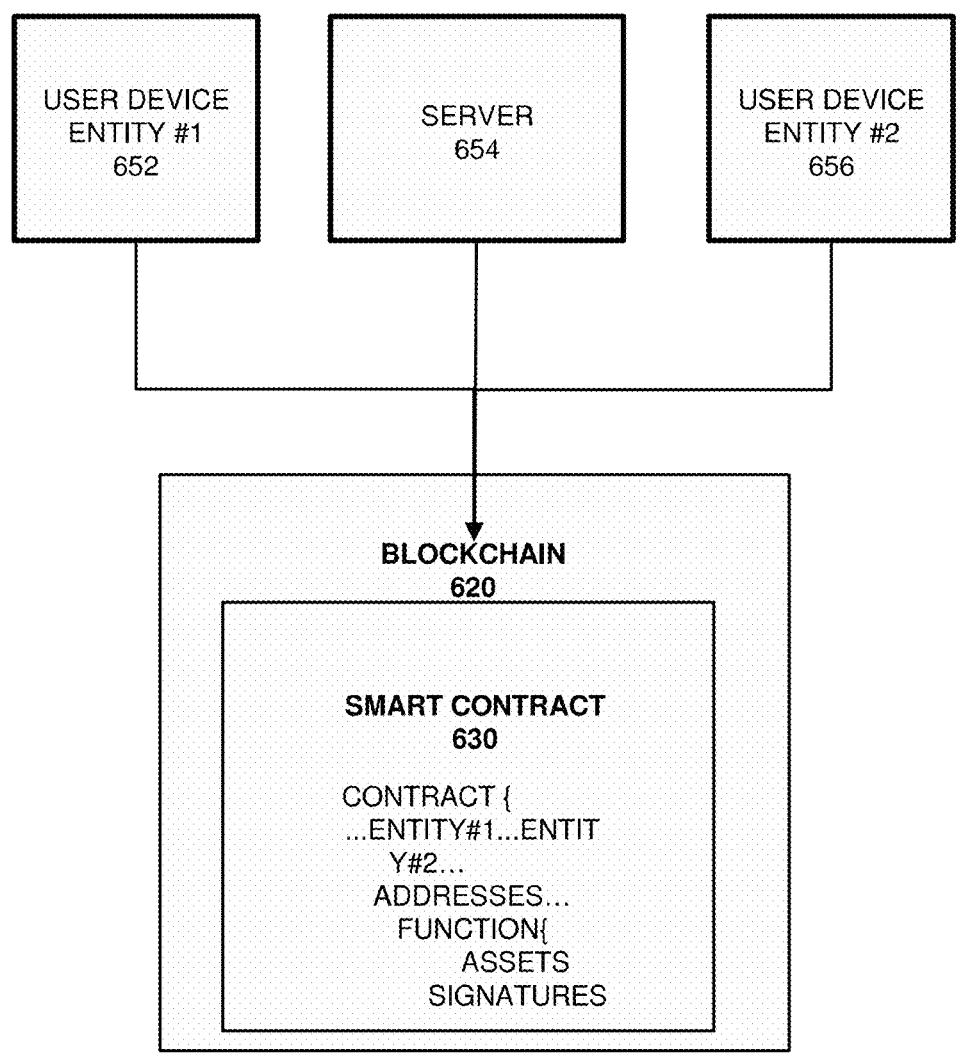
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a modified data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
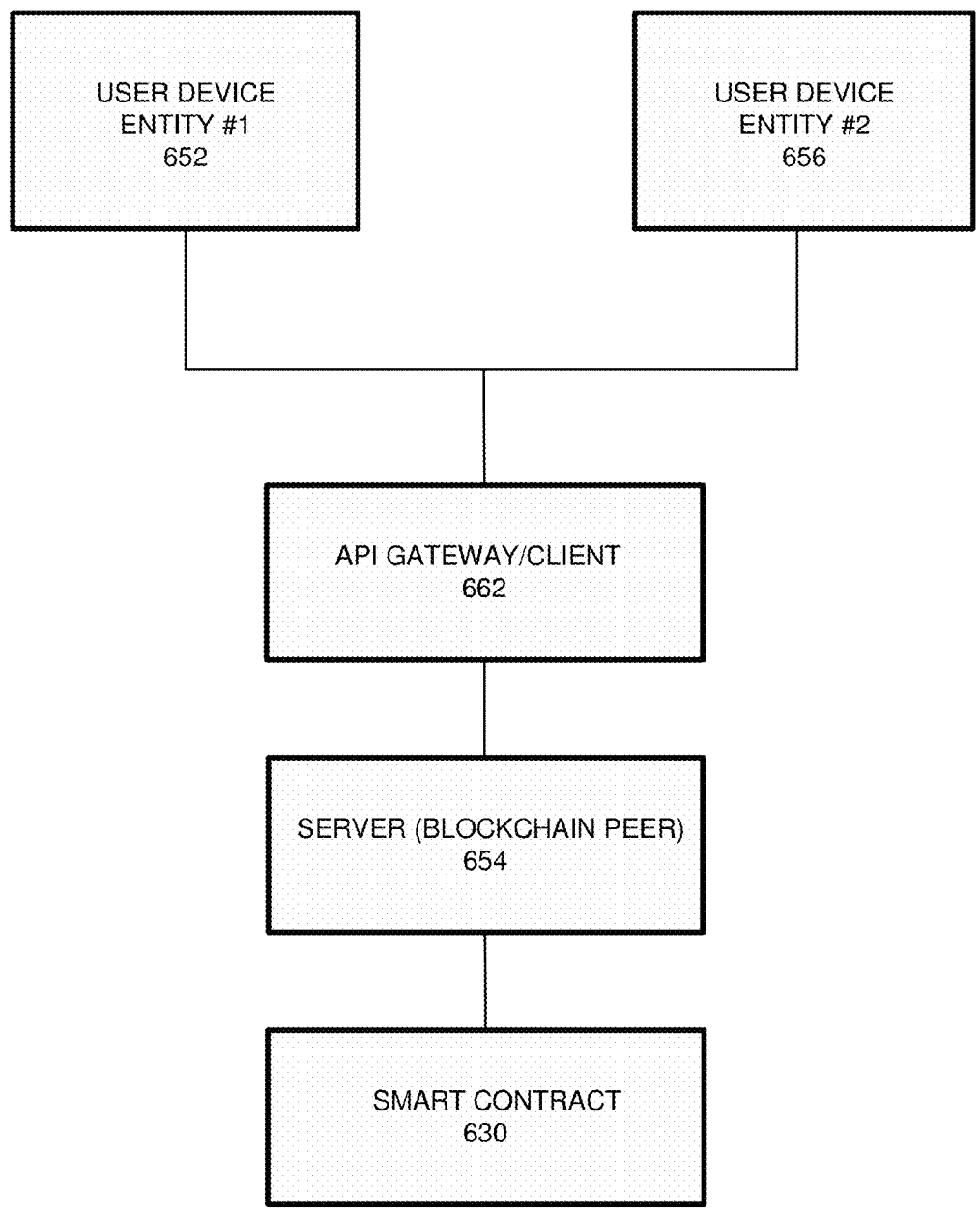
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a key value store) within a distributed ledger allowing clients 652 and 656 to query data on the world state as well as submit transactions into the blockchain network where, depending on the smart contract 630 and endorsement policy, endorsing peers will run the smart contracts 630.

Figure 7A:
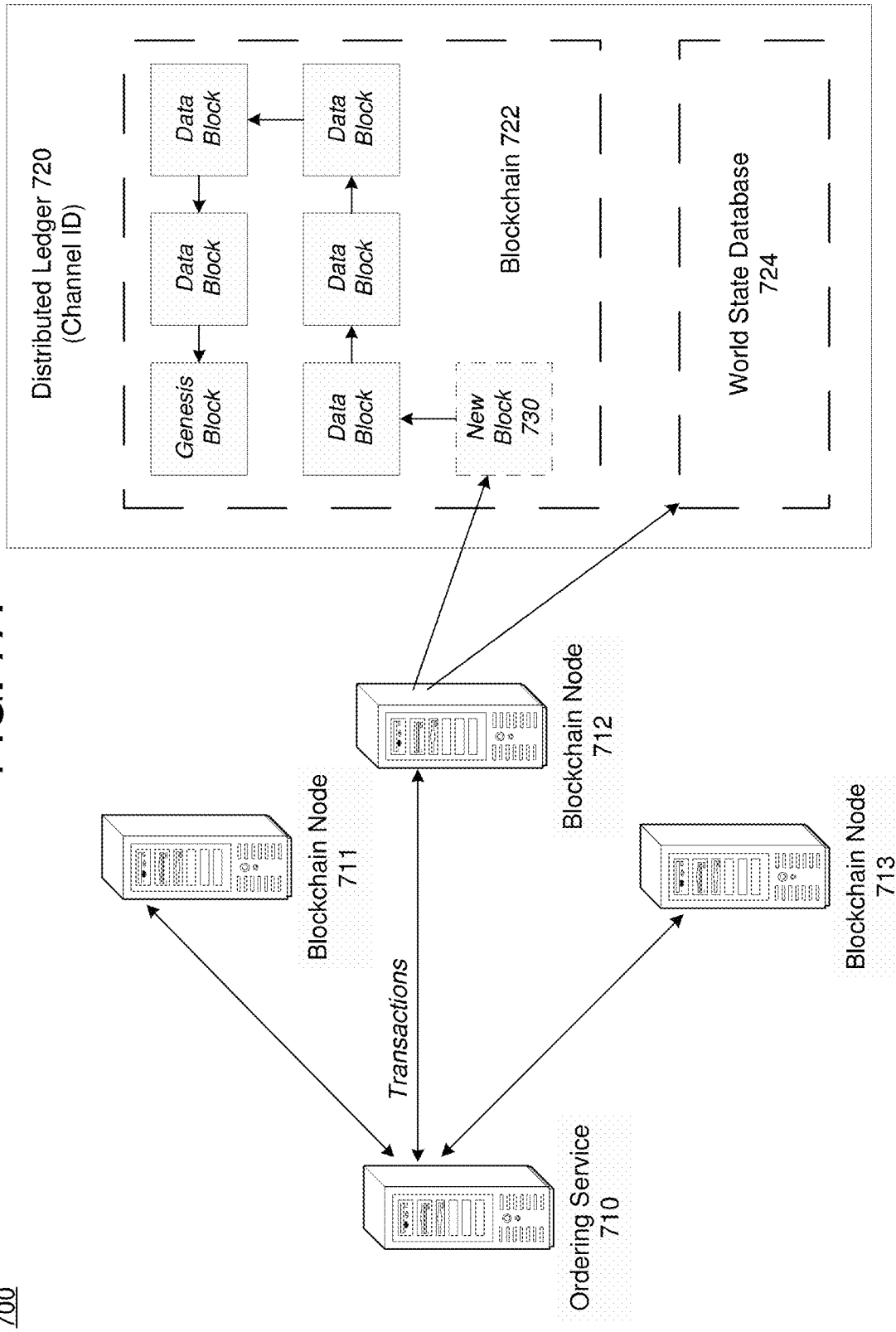
FIG. 7A is a diagram illustrating a process of a new block being added to a blockchain ledger, according to example embodiments.
Figure 7B:
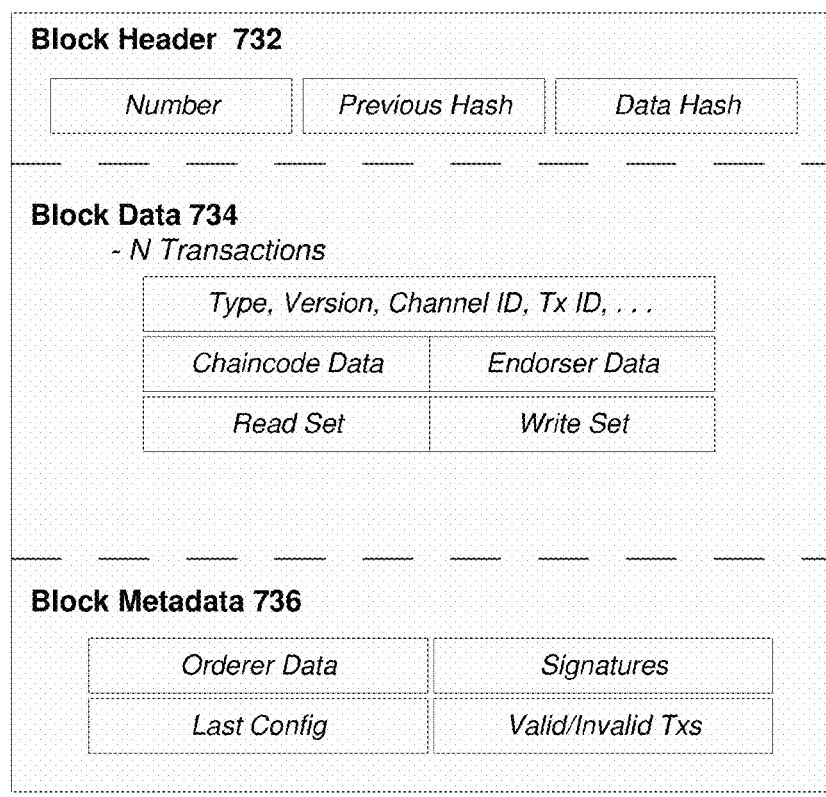
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. The distribute ledger 720 may correspond to a blockchain ledger managed by a subset of blockchain members referred to as trust anchor nodes. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both. As described herein, transactions may include send events, receive events, storage events, and the like of a multi-party process that is carried out between multiple untrusted organizations.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. According to various embodiments, the trust anchor nodes may have only one trust anchor channel, however, embodiments are not limited thereto. The blockchain 722 is a transaction log, structured as hash-linked blocks where each block contains a sequence of N transactions. Blocks (e.g., block 730) may include various components such as shown in the example of FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. For an authentication, the endorsing node may attempt to decrypt a hashed modified data file using a public key of the node that performed the hash. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713) which according to example embodiments are trust anchor nodes. In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
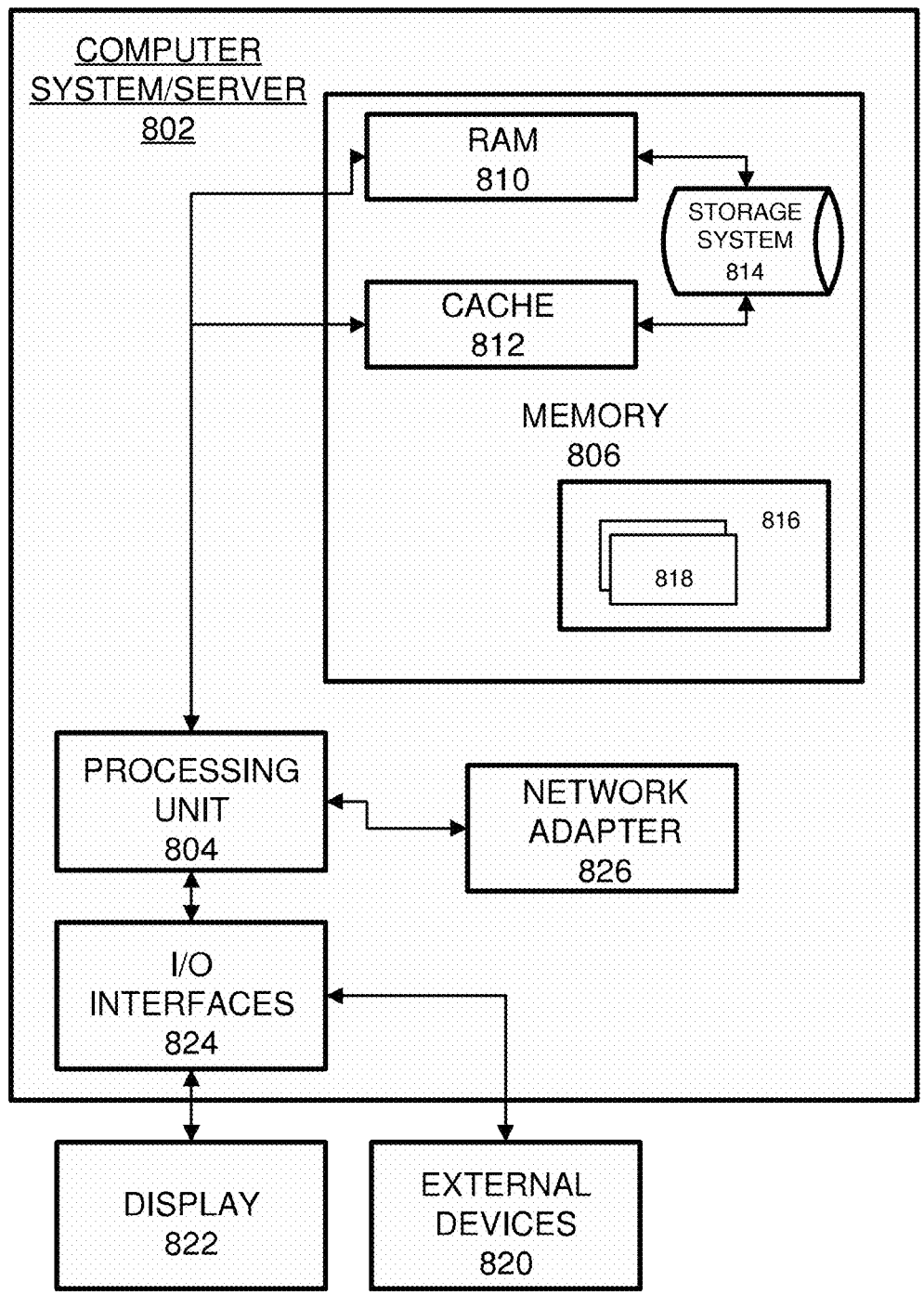
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform the method shown and described with respect to FIG. 5.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An anchor blockchain node, comprising:
   a storage device configured to store data via a blockchain ledger based on a consensus of a set of anchor blockchain nodes which are subset of nodes included in larger set of nodes in a blockchain network;
   a network interface configured to receive an access request from a blockchain member not included in the set of anchor blockchain nodes and which does not maintain a copy of the blockchain ledger; and
   a processor configured to verify a previously stored portion of the blockchain ledger which is accessible to the blockchain member based on the received access request, and share the previously stored portion of the blockchain ledger with a computing system of the blockchain member based on the verification;
   wherein the processor is further configured to control the network interface to establish a private channel between the anchor blockchain node and the computing system of the blockchain member.

2. The anchor blockchain node of claim 1, wherein the private channel between the anchor blockchain node and the computing system of the blockchain member is exclusive from a blockchain channel between the set of anchor blockchain nodes.

3. The anchor blockchain node of claim 2, wherein the processor is further configured to control the network interface to transmit the previously stored portion of the blockchain ledger to the computing system of the blockchain member based on the verification.

4. The anchor blockchain node of claim 1, wherein the data stored via the blockchain ledger comprises data that has been endorsed by a consensus of anchor blockchain nodes from among the set of anchor blockchain nodes.

5. The anchor blockchain node of claim 1, wherein the network interface is further configured to receive a data file for storage from the blockchain member that is not included in the set of anchor blockchain nodes.

6. The anchor blockchain node of claim 5, wherein the processor is further configured to control the network interface to transmit the received data file to the set of anchor blockchain nodes for endorsement and consensus among the set of anchor blockchain nodes.

7. The anchor blockchain node of claim 1, wherein the stored data comprises a document which is encrypted by the processor based on a unique per-asset encryption key.

8. The anchor blockchain node of claim 1, wherein the set of anchor blockchain nodes endorse transactions, maintain a replica of the blockchain ledger, and verify blockchain data for the blockchain member that does not maintain a copy of the blockchain ledger.

9. A method of an anchor blockchain node, comprising:
   storing data via a blockchain ledger based on a consensus of a set of anchor blockchain nodes which are subset of nodes included in larger set of nodes in a blockchain network;
   receiving an access request from a blockchain member not included in the set of anchor blockchain nodes and which does not maintain a copy of the blockchain ledger;
   verifying a previously stored portion of the blockchain ledger which is accessible to the blockchain member based on the received access request; and
   sharing the previously stored portion of the blockchain ledger with a computing system of the blockchain member based on the verification;
   wherein a private channel between the anchor blockchain node and the computing system of the blockchain member is established.

10. The method of claim 9, wherein the private channel between the anchor blockchain node and the computing system of the blockchain member is exclusive from a blockchain channel between the set of anchor blockchain nodes.

11. The method of claim 10, wherein the sharing comprises transmitting the previously stored portion of the blockchain ledger to the computing system of the blockchain member based on the verification.

12. The method of claim 9, wherein the data stored via the blockchain ledger comprises data that has been endorsed by a consensus of anchor blockchain nodes from among the set of anchor blockchain nodes.

13. The method of claim 9, further comprising receiving a data file for storage from the blockchain member that is not included in the set of anchor blockchain nodes.

14. The method of claim 13, further comprising transmitting the received data file to the set of anchor blockchain nodes for endorsement and consensus among the set of anchor blockchain nodes.

15. The method of claim 9, wherein the stored data comprises a document which is encrypted based on a unique per-asset encryption key.

16. The method of claim 9, wherein the set of anchor blockchain nodes endorse transactions, maintain a replica of the blockchain ledger, and verify blockchain data for the blockchain member that does not maintain a copy of the blockchain ledger.

17. A non-transitory computer readable medium comprising instructions that when read by a processor cause the processor to perform a method comprising:
   storing data via a blockchain ledger based on a consensus of a set of anchor blockchain nodes which are subset of nodes included in larger set of nodes in a blockchain network;
   receiving an access request from a blockchain member not included in the set of anchor blockchain nodes and which does not maintain a copy of the blockchain ledger;

verifying a previously stored portion of the blockchain ledger which is accessible to the blockchain member based on the received access request; and sharing the previously stored portion of the blockchain ledger with a computing system of the blockchain member based on the verification;

wherein a private channel between the anchor blockchain node and the computing system of the blockchain member is established.

18. The non-transitory computer-readable medium of claim 15, wherein the private channel between the anchor blockchain node and the computing system of the blockchain member is exclusive from a blockchain channel between the set of anchor blockchain nodes.

19. The non-transitory computer-readable medium of claim 15, wherein the data stored via the blockchain ledger comprises data that has been endorsed by a consensus of anchor blockchain nodes from among the set of anchor blockchain nodes.

20. The non-transitory computer-readable medium of claim 15, wherein the stored data comprises a document which is encrypted based on a unique per-asset encryption key.

* * * * *